United States Patent
Oh et al.

(10) Patent No.: US 7,885,254 B2
(45) Date of Patent: Feb. 8, 2011

(54) DELAY INSENSITIVE DATA TRANSFER APPARATUS WITH LOW POWER CONSUMPTION

(75) Inventors: Myeong-Hoon Oh, Daejon (KR); Seong-Woon Kim, Daejon (KR); Myung-Joon Kim, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 625 days.

(21) Appl. No.: 11/927,972

(22) Filed: Oct. 30, 2007

(65) Prior Publication Data

US 2008/0123765 A1 May 29, 2008

(30) Foreign Application Priority Data

Nov. 29, 2006 (KR) ...................... 10-2006-0119056

(51) Int. Cl.
*H04L 12/50* (2006.01)
*H04L 12/28* (2006.01)

(52) U.S. Cl. ...................................... 370/359; 370/419
(58) Field of Classification Search ........................ None
See application file for complete search history.

(56) References Cited

U.S. PATENT DOCUMENTS 7,282,946 B2 * 10/2007 Har et al. ...................... 326/21

2003/0107411 A1   6/2003  Martin et al.
2005/0200388 A1 * 9/2005  Har et al. ...................... 327/103

FOREIGN PATENT DOCUMENTS

| JP | 06-261092  | 9/1994 |
| JP | 2005-210159 | 8/2005 |
| KR | 1998083244 | 12/1998 |
| KR | 100447217  | 8/2004 |
| KR | 100609368  | 7/2006 |

* cited by examiner

*Primary Examiner*—Chirag G Shah
*Assistant Examiner*—Jenkey Van
(74) *Attorney, Agent, or Firm*—Ladas & Parry LLP

(57) ABSTRACT

Provided is a delay insensitive (DI) data transfer apparatus with low power consumption. The apparatus, includes: N number of encoders configured to receive and encode input request and data signals, where each of the N number of encoders includes: a reference current source circuit configured to generate a current; and a voltage-to-current converter circuit configured to output a current having a level of 0, output the current having the level of I, and output the current having the level of 2I; and N number of decoders configured to recover the current-level signals, where each of the decoders includes: a threshold current source circuit configured to generate first and second threshold currents; an input current mirror circuit configured to differentiate the first and second threshold currents; and a current-to-voltage converter circuit configured to detect the threshold current, recover a voltage input value, and extract data and request signals.

6 Claims, 7 Drawing Sheets

US 7,885,254 B2

DELAY INSENSITIVE DATA TRANSFER APPARATUS WITH LOW POWER CONSUMPTION

CROSS-REFERENCE(S) TO RELATED APPLICATIONS

The present invention claims priority of Korean Patent Application No. 10-2006-0119056, filed on Nov. 29, 2006, which is incorporated herein by reference.

BACKGROUND OF THE INVENTION

1. Field of the Invention

The present invention relates to a delay insensitive (DI) data transfer apparatus with low power consumption; and, more particularly, to a delay insensitive data transfer apparatus essential to a globally asynchronous locally synchronous (GALS) system.

This work was supported by the IT R&D program for MIC/IITA [2005-S-405-02, "A Development of the Next Generation Internet Server Technology"].

2. Description of Related Art

As a fabrication technology is rapidly developed, devices are highly integrated and a chip size gradually becomes large, so that interconnects become complicated. Therefore, the number and length of transmission lines and delay variability between the transmission lines become the most important factors in design for correct operations of a chip. Under these circumstances, many studies have been conducted to apply a globally asynchronous locally synchronous (GALS) system to a system on chip (SoC) design so as to solve a problem of a typical design to drive an entire chip by using a single clock, considering a delay time of a transmission line.

The GALS system integrates a plurality of modules driven with independent clocks by using an asynchronous handshake protocol and performs a data transfer between the modules. Thus, the GALS system necessarily requires a delay insensitive data transfer scheme that can stably transfer data, regardless of length of a transmission line within a semiconductor chip.

A dual-rail scheme and a 1-of-4 scheme have been proposed as a representative delay insensitive data transfer scheme. However, these schemes require (2N+1) lines for an N-bit data transfer. Due to the increase in the number of the lines, power consumption and/or design complexity may increase. In addition to the delay insensitive data transfer scheme, many studies have been conducted on multi-valued logic circuits for reducing the number of lines necessary for the data transfer. A variety of inventions associated with data transfer schemes using multi-valued logic circuits will be described below.

Korean Patent Registration No. 10-447217, entitled "SIGNAL TRANSMISSION/RECEPTION DEVICE OF NEW WIRING SYSTEM" discloses a signal transmission/reception device of a new wiring system, which can reduce a wiring area by simultaneously transmitting different kinds of signals through one transmission line between plural functional blocks within an integrated circuit. Theoretically, in the case of an N-bit data transfer, voltage values of $2^N$ triangular pulses are encoded and transmitted through one transmission line, and a receiver circuit detects the encoded voltage values and recovers data. In this way, the number of transmission lines required for wiring is reduced and an entire area of an integrated circuit is reduced. However, as the number of the voltage values that can be encoded in the transmission line increases, the number of logics to be decoded increases. Thus, the complexity of the receiver circuit may significantly increase, and the reduction in the number of the transmission lines is limited. As a supply voltage in the integrated circuit is lowered, the multi-valued logic circuit technology using the voltages used in Korean Patent Publication No. 10-447217 may degrade voltage-noise margin characteristic in the receiver circuit.

U.S. Patent Publication No. 2003-0107411, entitled "LOW POWER NRZ INTERCONNECT FOR PULSED SIGNALING", discloses a current mode multi-valued logic circuit, not a voltage mode. In U.S. Patent Publication No. 2003-0107411, input data signals are transferred through a differential transmission line in a pulse form. A rising edge and a falling edge of a voltage level input signal are sensed and encoded, and then converted into a current level signal. Likewise, the receiver converts the current-level signal into a voltage-level signal and decodes it by using a differential amplifier. In U.S. Patent Publication No. 2003-0107411, a current-level differential transmission line is used for reducing power consumption generated when data is transmitted in a return-to-zero format. However, since 2N transmission lines are required for N-bit data transfer, the proposed data transfer apparatus has no effect in reducing the number of the transmission lines. Further, although the proposed apparatus can be applied to an inter-chip interface on a board, it is not suitable to an inter-module data transfer inside a chip.

The objects of Korean Patent registration No. 10-447217 and U.S. Patent Publication No. 2003-0107411 are to reduce the wiring area by reducing the number of the transmission lines and to reduce the power consumption of the inter-chip interface. However, since the conventional apparatuses do not provide the function for supporting the handshake protocol necessary for the delay insensitive data transfer, they cannot be applied to the GALS system.

Apparatuses using multi-valued logic circuits have been proposed for supporting the delay insensitive data transfer and reducing the number of transmission lines necessary for the delay insensitive data transfer. Korean Patent Registration No. 10-609368 discloses a delay insensitive data transfer apparatus using a current mode multi-valued logic circuit. Due to the use of the current mode multi-valued circuit, the data transfer apparatus is not affected by a noise margin of a supply voltage and three logics per one transmission line are expressed. Thus, (N+1) transmission lines are required for N-bit data transfer. Further, since the data transfer apparatus supports a synchronization circuit, it can be applied to the GALS system. Moreover, compared with the existing delay insensitive data transfer apparatus, the wiring area and the power consumption can be reduced as much as the reduced number of the transmission lines. However, in Korean Patent Registration No. 609368, the weight of static power is great. Therefore, the data transfer apparatus is susceptible in view of power consumption as a transfer rate becomes lower. A lot of power is consumed even in an idle mode in which data are not transferred. This is contrary to contributing to the power consumption by reducing the number of the transmission lines. Rather, this may cause adverse affects in view of power consumption.

SUMMARY OF THE INVENTION

An embodiment of the present invention is directed to providing a data transfer apparatus that can significantly reduce static power using a modified encoder.

In accordance with an aspect of the present invention, there is provided a delay insensitive data transfer apparatus, including: N number of encoders configured to receive and encode an input request signal and data signals inputted from a data transmitter into current-level signals, each of the N number of encoders including: a reference current source circuit configured to generate a current having a level of I and a current having a level of 2I; and a voltage-to-current converter circuit configured to output a current having a level of 0 indicating a space state according to the request signal inputted from the data transmitter, output the current having the level of I when the data signal is 0 in such a state that the request signal inputted from the data transmitter is in an activated state, and output the current having the level of 2I when the data signal is 1; and N number of decoders configured to recover the current-level signals inputted from the encoders into voltage-level signals, each of the decoders including: a threshold current source circuit configured to generate a first threshold current and a second threshold current; an input current mirror circuit configured to differentiate the first threshold current and the second threshold current in response to a level of the input current inputted from the encoder; and a current-to-voltage converter circuit configured to detect the differentiated threshold current, recover a voltage input value due to the differentiated current, and extract a data signal and a request signal from the recovered voltage-level signal.

In accordance with an aspect of the present invention, there is provided a delay insensitive data transfer apparatus, including: N number of first encoders configured to receive and encode an input request signal and data signals inputted from a data transmitter into current-level signals; N number of first decoders configured to recover the current-level signals inputted from the first encoders into voltage-level signals; a second encoder configured to receive the request signal through a request signal input terminal and a data signal input terminal and output a current-level signal; a second decoder configured to output a completion signal when the current-level signal from the second encoder has a level of 2I; and a request signal processor configured to output a latch enable signal for latching N-bit data signals when the completion signal is inputted from the second decoder, wherein the first encoders output a current having a level of 0 indicating a space state according to the request signal inputted from the data transmitter, output a current having a level of I when the data signal is 0 in such a state that the request signal inputted from the data transmitter is in an activated state, and output a current having a level of 2I when the data signal is 1.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

DESCRIPTION OF SPECIFIC EMBODIMENTS

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 1:
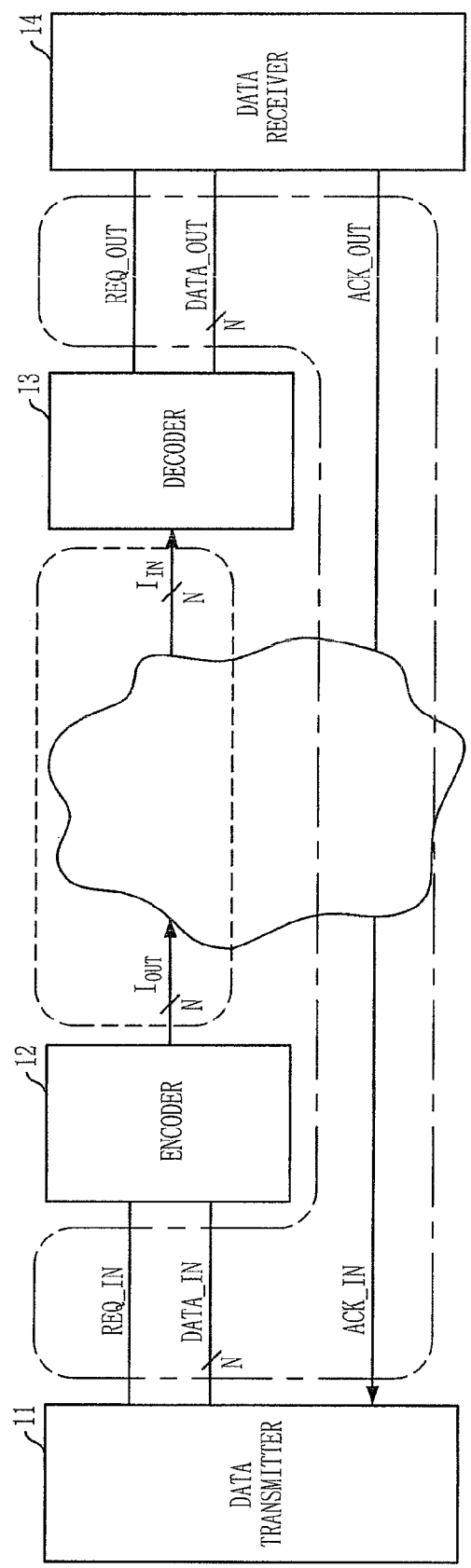
FIG. 1 is a block diagram of a data transfer apparatus in accordance with an embodiment of the present invention.

FIG. 1 is a block diagram of a data transfer apparatus in accordance with an embodiment of the present invention.

Referring to FIG. 1, the data transfer apparatus includes a data transmitter 11, an encoder 12, a decoder 13, and a data receiver 14.

The data transmitter 11 transmits a voltage-level request signal REQ_IN and a voltage-level data signal DATA_IN to the encoder 12. The encoder 12 encodes the voltage-level data signal DATA_IN and the voltage-level request signal REQ_IN into current-level signals $I_{OUT}$, so that the data transfer is performed insensitive to a delay time of a transmission line.

The decoder 13 receives the current-level signals $I_{IN}$ from the encoder 12 and decodes them into voltage-level signals to thereby output the original data signal DATA_OUT and the original request signal REQ_OUT.

The data receiver 14 transfers an acknowledge signal (ACK) to the data transmitter 11 in response to the data signal DATA_OUT and the request signal REQ_OUT output from the decoder 13.

Since the data transmitter 11 and the data receiver 14 are a local module of a GALS system, they use a 4-phase bundled data protocol, which is easily compatible with synchronous circuits, and receive binary voltage values in a transfer data format. A 4-phase delay insensitive protocol is used between the encoder 12 and the decoder 13, and a current-level data is transferred.

Figure 2:
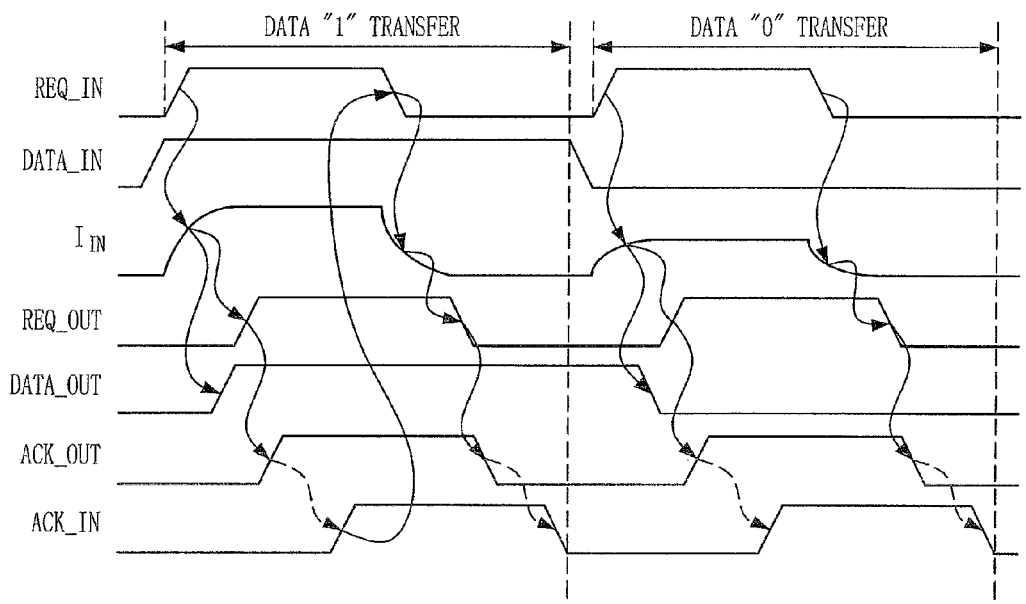
FIG. 2 is a timing diagram of signals used in the data transfer apparatus illustrated in FIG. 1.

FIG. 2 is a timing diagram of signals used in the data transfer apparatus illustrated in FIG. 1.

Referring to FIG. 2, data flow can be classified into a data "1" transfer and a data "0" transfer. On the assumption of the 4-phase bundled data, the data transmitter 11 generates the request signal REQ_IN and the data signal DATA_IN according to types of transfer data. The encoder 12 encodes the request signal REQ_IN and the data signal DATA_IN into current-level signals and outputs them to the decoder 13. The decoder 13 decodes the current-level signals into the voltage-level request signal REQ_OUT and the voltage-level data signal DATA_OUT and outputs them to the data receiver 14. The data receiver 14 informs the data transmitter 11 of the data reception by transferring the acknowledge signal ACK_OUT to the data transmitter 11. Thereafter, the data transmitter 11 changes to a space state and outputs the request signal REQ_IN of "0". The encoder 12 encodes the request signal REQ_IN of "0" into a current level of "0" and transfers it to the decoder 13 in the delay insensitive transfer scheme. The decoder 13 decodes the current-level signal and transfers the space state to the data receiver 14. Then, one cycle is terminated in response to the acknowledge signal ACK_IN of "0".

Figure 3:
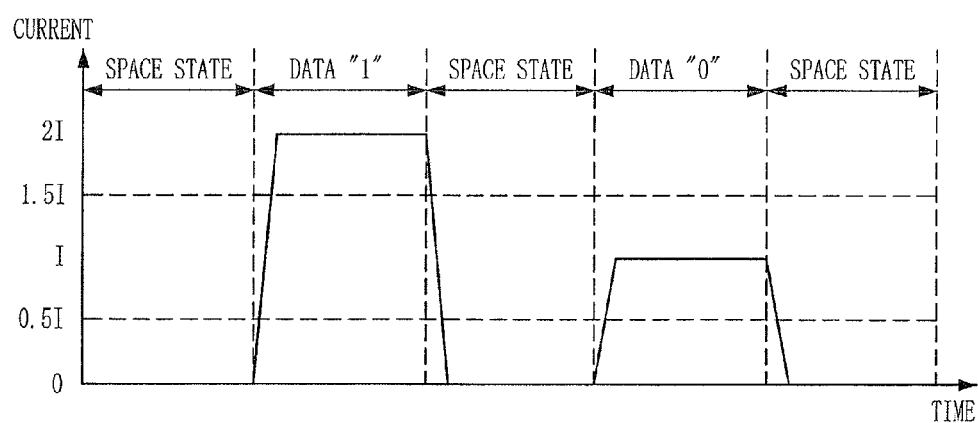
FIG. 3 is a graph for explaining an encoding scheme in accordance with an embodiment of the present invention.

FIG. 3 is a graph for explaining an encoding scheme in accordance with an embodiment of the present invention.

In data transfer between the encoder 12 and the decoder 13, the data "0" transfer and the data "1" transfer are mapped into a current level I and a current level 2I, respectively. In order to reduce the static power, i.e., the power consumed even in the idle state, the space state described in FIG. 2 is encoded into a current level "0". The decoder 13 recognizes the data "1" transfer when the current is greater than a threshold current of 1.5I, recognizes the space state when the current is less than a threshold current of 0.5I, and recognizes the data "0" transfer when the current is between the threshold current of 0.5I and the threshold current of 1.5I. Detailed circuit diagrams of the encoder and the decoder necessary for a 1-bit data transfer are illustrated in FIGS. 4 and 5.

Figure 4:
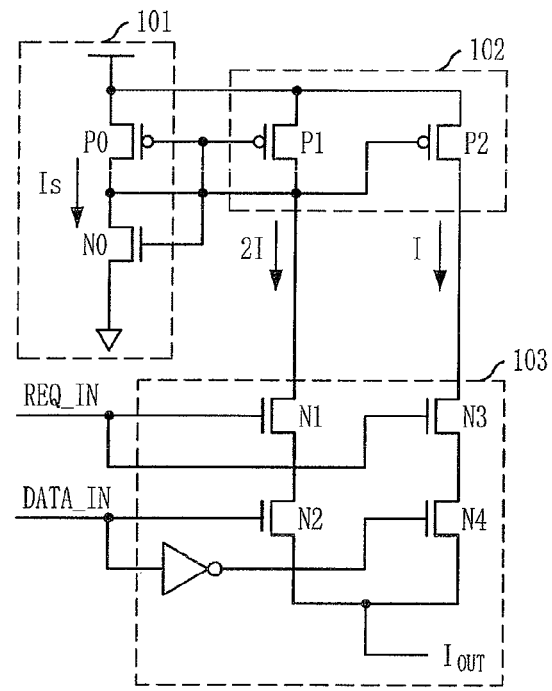
FIG. 4 is a circuit diagram of an encoder in accordance with an embodiment of the present invention.
Figure 5:
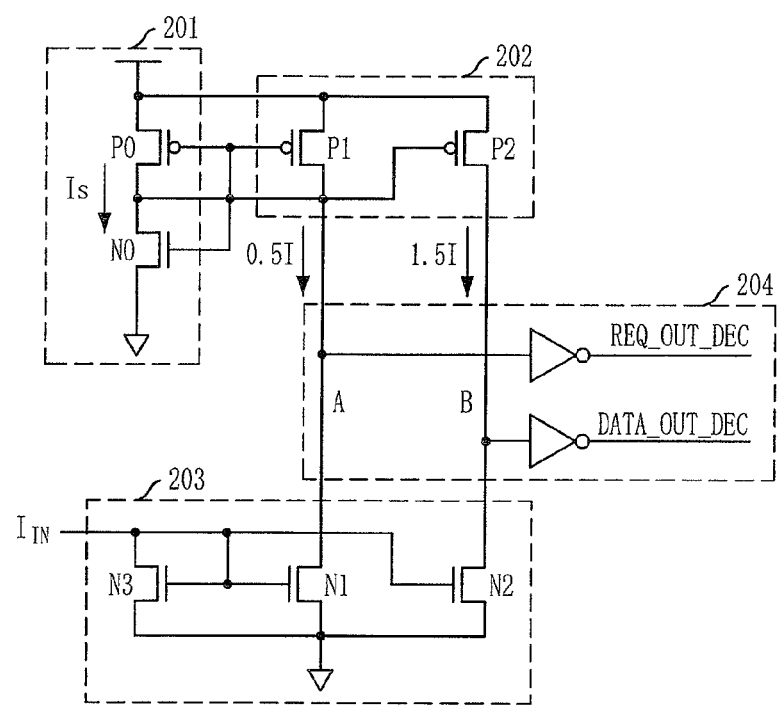
FIG. 5 is a circuit diagram of a decoder in accordance with an embodiment of the present invention.

FIG. 4 is a circuit diagram of the encoder in accordance with an embodiment of the present invention.

Referring to FIG. 4, the encoder includes a reference current source circuit 101, a reference current mirror circuit 102, and a voltage-to-current converter circuit 103.

The reference current source circuit 101 is configured to generate a constant current $I_S$, and the reference current mirror circuit 102 is configured to generate reference currents 2I and I according to a level of the constant current $I_S$. The voltage-to-current converter circuit 103 is configured to select one of the reference currents 2I and I in response to the request signal REQ_IN and the data signal DATA_IN input to the encoder.

More specifically, the reference current source circuit 101 includes a PMOS transistor P0 and an NMOS transistor N0 and serves as a current source to generate the constant current $I_S$. In the PMOS transistor P0 and the NMOS transistor N0, a voltage between a drain and a source is equal to a voltage between a gate and the source. Therefore, the reference current source always operates in a saturation region, so that the constant current $I_S$ flows through the drain serving as a common node.

The current mirror circuit 102 includes PMOS transistors 1 and P2. When the constant current $I_S$ is mirrored to drains of the PMOS transistors P1 and P2, the current mirror circuit 102 generates the reference currents 2I and I by controlling an amount of a current flowing through the drains according to a ratio of a channel width to a channel length in the PMOS transistors P1 and P2.

The voltage-to-current converter circuit 103 includes NMOS transistors N1, N2, N3 and N4 and an inverter. The NMOS transistors N1, N2, N3 and N4 combine the request signal REQ_IN and the data signal DATA_IN input to the encoder, select one of the reference currents 2I and I generated from the current mirror circuit 102, and maps it into a specific current amount.

In other words, the NMOS transistors N1 and N3 are turned off when the request signal REQ_IN is "0", so that the output current $I_{OUT}$ has a current level of "0" regardless of the data signal. On the other hand, the NMOS transistors N1 and N3 are turned on when the request signal REQ_IN is "1", so that the reference currents 2I and I are input to the sources of the NMOS transistors N2 and N4. In this state, when the data signal DATA_IN is "0", the NMOS transistor N4 is turned on by an output signal of the inverter, so that the current I is output as the output signal $I_{OUT}$. When the data signal DATA_IN is "1", the NMOS transistor N2 is turned on, so that the current 2I is output as the output signal $I_{OUT}$.

FIG. 5 is a circuit diagram of the decoder in accordance with an embodiment of the present invention.

Referring to FIG. 5, the decoder includes a threshold current source circuit 201, a threshold current mirror circuit 202, an input current mirror circuit 203, and a current-to-voltage converter circuit 204.

The threshold current source circuit 201 generates a constant current, and the threshold current mirror circuit 202 generates threshold currents 0.5I and 1.5I necessary for detecting an input reference current in response to a level of the constant current. In other words, the threshold current source circuit 201 and the threshold current mirror circuit 202 operate as a reference current source.

The input current mirror circuit 203 differentiates the threshold currents 0.5I and 1.5I generated from the threshold current mirror circuit 202 in response to the level of the input current $I_{IN}$ inputted from the encoder.

The current-to-voltage converter circuit 204 detects the differentiated threshold current and recovers the voltage input value corresponding to the differentiated current.

To be specific, the threshold current source circuit 101 includes a PMOS transistor P0 and an NMOS transistor N0, and the threshold current mirror circuit 202 includes PMOS transistors P1 and P2.

The input current is inputted to an NMOS transistor N3 and applied to NMOS transistors N1 and N2 of the input current mirror circuit 203. The NMOS transistors N1 and N2 of the input current mirror circuit 203 are connected to the PMOS transistors P1 and P2 of the threshold current mirror circuit 202. Thus, the input current mirror circuit 203 operates as a current comparator circuit.

The input current mirror circuit 203 detects the level of the input current by using a differential current between the predetermined input current of 0, I and 2I and the threshold voltage generated from the PMOS transistors P1 and P2. The original voltage-level values can be recovered using the phenomenon that the voltages at the nodes A and B are changed according to the difference between the input current and the threshold current. To this end, the threshold currents 0.5I and 1.5I must be generated from the PMOS transistors P1 and P2 of the threshold current mirror circuit 202.

When $I_{IN}$=0, the drains of the NMOS transistors N1 and N2 of the input current mirror circuit 203 do not pull the currents and thus the nodes A and B maintain a voltage logic value of "1". When the current I is input, the drain of the NMOS transistor N1 uses the threshold current 0.5I so as to pull the current I. Thus, the node A has a voltage logic value of "0", but the node B has a voltage logic value of "1" due to the differential current. Likewise, the nodes A and B have a voltage logic value of "0" for the input current 2I.

The current-to-voltage converter circuit 204 includes a first inverter and a second inverter. The first inverter is configured to invert the voltage logic value detected at the node A to output the request signal REQA_OUT_DEC, and the second inverter is configured to invert the voltage logic value detected at the node B to output the data signal DATA_OUT_DEC. Accordingly, the current-to-voltage converter circuit can recover the original data signal inputted from the data transmitter.

Table 1 below shows a current mapping according to the input request signal REQ_IN and the input data signal DATA_IN. Voltage logic values at the nodes A and B due to the same current level are also shown in Table 1.

TABLE 1

| REQ_IN | 0 | 1 | 1 |
|---|---|---|---|
| DATA_IN | X | 0 | 1 |
| Current level | 0 | I | 2I |
| Voltage at (Node A, Node B) | (1, 1) | (0, 1) | (0, 0) |

To recover the request signal REQ_IN and the data signal DATA_IN, the decoder uses the voltages of the nodes A and B, which change according to the input current amount. A standard cell is used and the request signal REQ_OUT_DEC and the data signal DATA_OUT_DEC are generated like the decoder of FIG. 5.

Unlike the data "0" transfer, when the space state is mapped into the current level of "0", the decoder experiences the threshold current two times in the data "1" transfer. If two decision levels deciding the output value in one data transfer cycle exist, a stable output value cannot be ensured. Further, this may cause a fatal error in the operation of the delay insensitive transfer mechanism.

Figure 6:
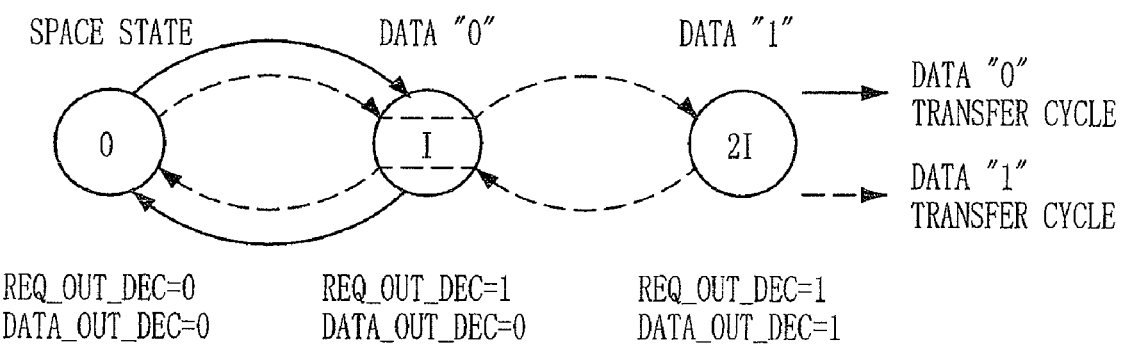
FIG. 6 is a state diagram for explaining a change in an input current state and an output value in accordance with an embodiment of the present invention.

FIG. 6 is a state diagram illustrating the output values REQ_OUT_DEC and DATA_OUT_DEC generated from the decoder according to the input current level and the respective current levels.

Referring to FIG. 6, the data "0" transfer cycle has no problem, but the data "1" transfer cycle naturally experiences the current level I when the current level changes from 0 to 2I. Since the request signal REQ_OUT_DEC changes to "1" earlier than the data signal DATA_OUT_DEC, the request signal is generated before the data signal is recovered. This phenomenon may violate the bundled data assumption that the data signal must be stabilized before the request signal is generated. Thus, a stable data transfer cannot be ensured. In an actual circuit implementation, the bundled data transfer scheme uses the request signal REQ_OUT_DEC for latching the data signal DATA_OUT_DEC.

In the case of the data "1" transfer, the data signal DATA_OUT_DEC is latched at the current level 2I or higher, not the current level I, in order for a correct operation of the transfer mechanism. Referring to FIG. 6, in the data "1" transfer cycle in which the current level changes from 0 to 2I, the data signal DATA_OUT_DEC is maintained at "0" until the current level I but the request signal REQ_OUT_DEC changes to "1" at current level I. Then data "0" can be latched in advance by REQ_OUT_DEC, even though the data signal DATA_OUT_DEC is asserted to "1" later at the current level of 2I. This situation is a kind of the violation of the bundled data assumption. The problem of the data "1" transfer can be solved by using this timing to generate a control signal for latching the data signal DATA_OUT_DEC.

Figure 7:
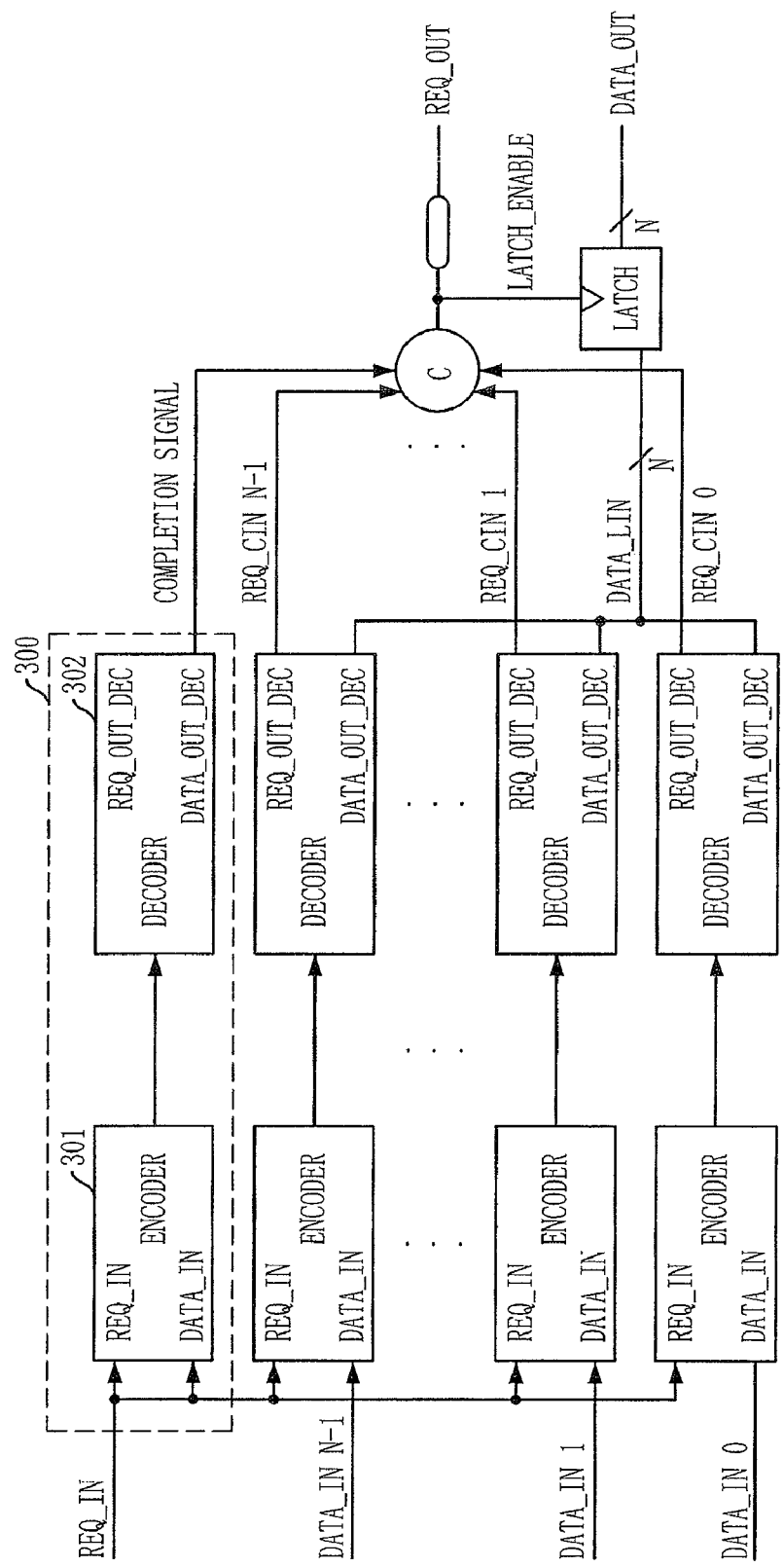
FIG. 7 is a block diagram of an N-bit data transfer apparatus in accordance with an embodiment of the present invention.

FIG. 7 is a block diagram of an N-bit data transfer apparatus in accordance with an embodiment of the present invention, which can solve the problem of the data "1" transfer.

Referring to FIG. 7, the data transfer apparatus includes an encoder 301 and a decoder 302, as well as N number of encoders and N number of decoders for N-bit data transfer. The encoder 301 receives the request signal through a request signal input terminal and a data signal input terminal, and outputs a current-level encoding signal. The decoder 302 receives the current-level encoding signal from the encoder 301, and outputs a completion signal through a data signal output terminal.

When the request signal is "1", the decoder 302 outputs the completion signal of "1" through the data signal output terminal, regardless of N-bit data. In other words, when the request signal is "1", the encoder 301 outputs the signal having the current level of 2I. (A, B) of the decoder 302 is (0, 0) but the completion signal output through the data signal output terminal is "1" because of the second inverter of the current-to-voltage converter circuit 204.

The completion signal output from the decoder 302 is input to a request signal processor C. The request signal processor C outputs the request signal to the data receiver according to the request signals inputted from the N number of decoders. When the completion signals of "1" are inputted from the decoder 302, a latch enable signal LATCH_ENABLE is output to a latch.

When any one bit of the N-bit data transfers the data "1", the completion signal of the decoder 302 is used to adjust the timing of latching the N-bit data signals DATA_OUT_DEC after the current level 2I, not the current level I by using the latch enable signal LATCH_ENABLE.

The timing of the completion signal is equal to the 2I current driving scheme in which the data is "1" among the output signals of the decoders. Thus, if using a propagation delay of the request signal processor C, the bundled data assumption can be satisfied when the data signals from the N number of decoders are latched.

Figure 8:
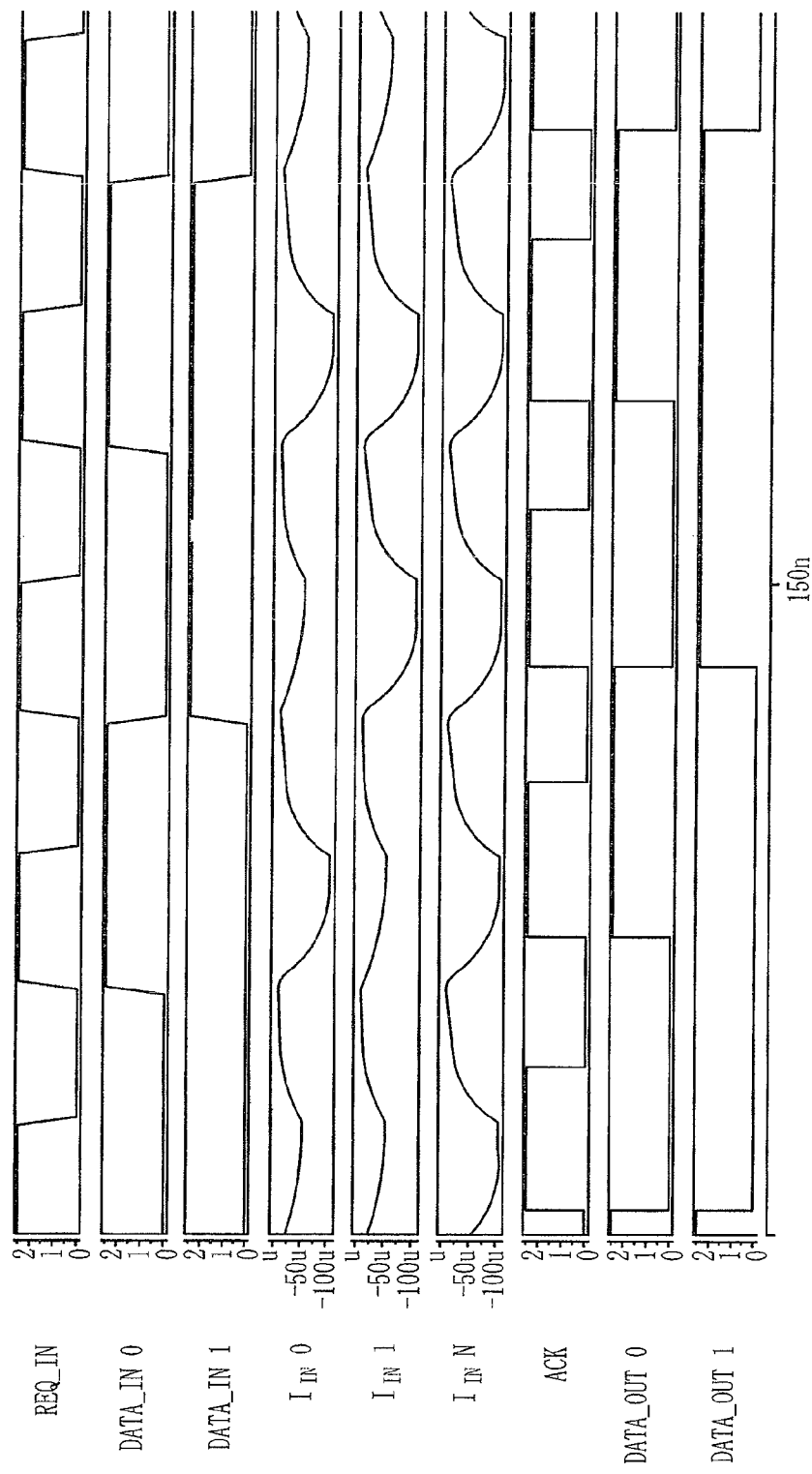
FIG. 8 is a simulation result of a 2-bit data transfer in accordance with an embodiment of the present invention.

FIG. 8 shows a simulation result of the cases necessary for 2-bit data transfer, i.e., "00", "01", "10" and "11". The current I of 54 μA was used in the simulation. The data transfer was performed correctly in all the cases.

Figure 9:
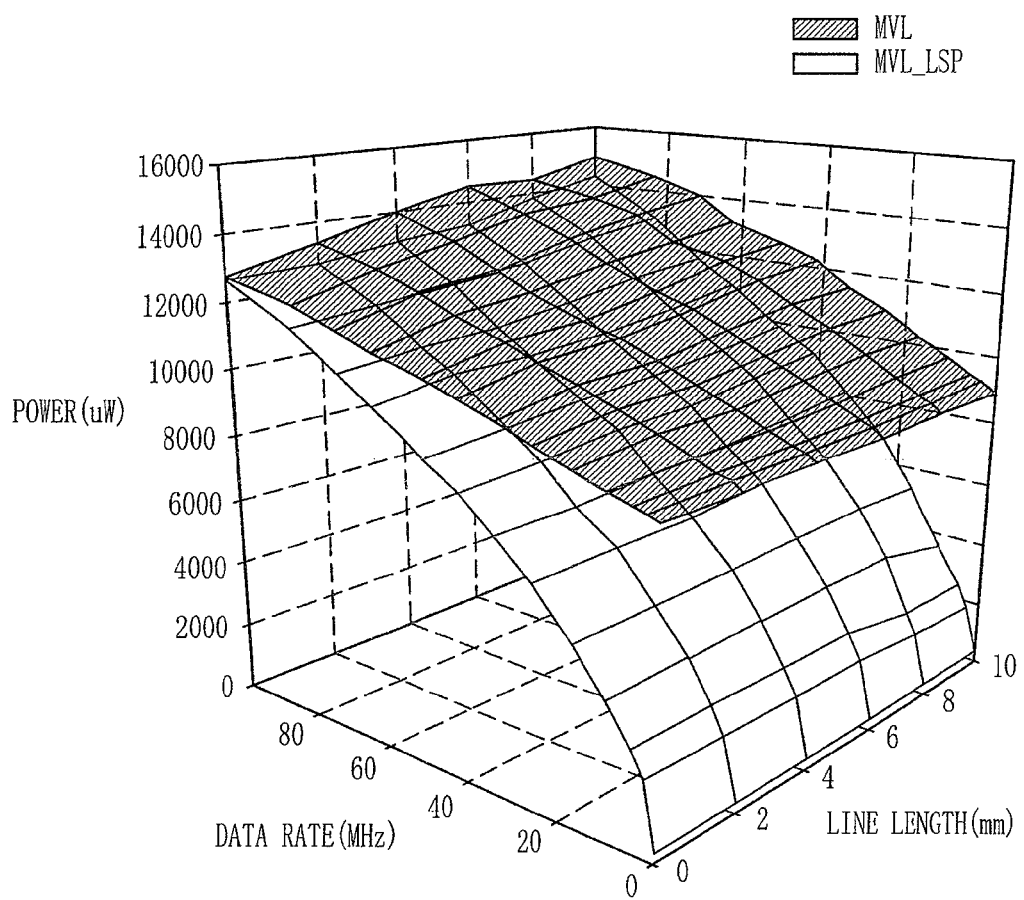
FIG. 9 is a graph of power consumption in a 32-bit data transfer in accordance with an embodiment of the present invention.

FIG. 9 is a graph illustrating the comparison of power consumption between the transfer apparatus (MVL) of Korean Patent Publication No. 10-609368 and the transfer apparatus (MVL_LSP) of the present invention.

Power consumed according to an input data rate and a line length was measured in the same simulation environment as the 32-bit data transfer. The simulation result showed that the transfer apparatus of the present invention consumed little power over an entire area, regardless of the data rate and the line length. Particularly, the power consumption in the idle state, i.e., the power consumption due to the static current, was significantly reduced. At the data rate of "0" meaning the idle state, the transfer apparatus using the conventional current mode consumed power of 8,896 μW. However, the transfer apparatus of the present invention consumed power of 330 μW. That is, the transfer apparatus of the present invention obtained a power consumption gain of approximately 96.3%.

As described above, the delay insensitive data transfer apparatus expressing three logics on one transmission line in accordance with the embodiment of the present invention can significantly reduce the static power by encoding the data "1" using the current level of 2I, encoding the space state using the current level of less than 0.5I, and encoding the data "0" using the current level of I.

While the present invention has been described with respect to the specific embodiments, it will be apparent to those skilled in the art that various changes and modifications may be made without departing from the spirit and scope of the invention as defined in the following claims.

What is claimed is:

1. A delay insensitive data transfer apparatus, comprising:
   N number of first encoders configured to receive and encode an input request signal and data signals inputted from a data transmitter into current-level signals;
   N number of first decoders configured to recover the current-level signals inputted from the first encoders into voltage-level signals;
   a second encoder configured to receive the request signal through a request signal input terminal and a data signal input terminal and output a current-level signal;

a second decoder configured to output a completion signal when the current-level signal from the second encoder has a level of 2I; and a request signal processor configured to output a latch enable signal for latching N-bit data signals when the completion signal is inputted from the second decoder, where the first encoders output a current having a level of 0 indicating a space state according to the request signal inputted from the data transmitter, output a current having a level of I when the data signal is 0 in such a state that the request signal inputted from the data transmitter is in an activated state, and output a current having a level of 2I when the data signal is 1.

2. The delay insensitive data transfer apparatus of claim 1, wherein each of the first encoders includes:

a reference current source circuit configured to generate the current having the level of I and the current having the level of 2I; and a voltage-to-current converter circuit configured to output the current having the level of 0 indicating the space state according to the request signal inputted from the data transmitter, output the current having the level of I when the data signal is 0 in such a state that the request signal inputted from the data transmitter is in an activated state, and output the current having the level of 2I when the data signal is 1.

3. The delay insensitive data transfer apparatus of claim 2, wherein each of the first decoders includes:

a threshold current source circuit configured to generate a first threshold current and a second threshold current;

an input current mirror circuit configured to differentiate the first threshold current and the second threshold current in response to a level of the input current inputted from the encoder; and a current-to-voltage converter circuit configured to detect the differentiated threshold current, recover a voltage input value due to the differentiated current, and extract a data signal and a request signal from the recovered voltage-level signal.

4. The delay insensitive data transfer apparatus of claim 3, wherein the request signal processor delays a completion signal inputted from the second decoder by using a propagation delay, and outputs a latch enable signal when the first decoders output voltage signals corresponding to a current having a level of 2I.

5. A delay insensitive data transfer apparatus, comprising:

N number of encoders configured to receive and encode an input request signal and data signals inputted from a data transmitter into current-level signals, where each of the N number of encoders includes:

a reference current source circuit configured to generate a current having a level of I and a current having a level of 2I; and a voltage-to-current converter circuit configured to output a current having a level of 0 indicating a space state according to the request signal inputted from the data transmitter, output the current having the level of I when the data signal is 0 in such a state that the request signal Inputted from the data transmitter is in an activated state, and output the current having the level of 2I when the data signal is 1; and N number of decoders configured to recover the current-level signals inputted from the encoders into voltage-level signals, where each of the decoders includes:

a threshold current source circuit configured to generate a first threshold current and a second threshold current;

an input current mirror circuit configured to differentiate the first threshold current and the second threshold current in response to a level of the input current inputted from the encoder; and a current-to-voltage converter circuit configured to detect the differentiated threshold current, recover a voltage input value due to the differentiated current, and extract a data signal and a request signal from the recovered voltage-level signal; and wherein the voltage-to-current converter circuit includes:

a first transistor having a gate receiving the request signal and a source receiving the current having the level of 2I;

a second transistor having a gate receiving the request signal and a source receiving the current having the level of I;

a third transistor having a gate receiving the data signal and a source connected to a drain of the first transistor;

a first inverter configured to invert the data signal; and a fourth transistor having a gate receiving an output signal of the first inverter and a source connected to a drain of the second transistor.

6. A delay insensitive data transfer apparatus, comprising:

N number of encoders configured to receive and encode an input request signal and data signals inputted from a data transmitter into current-level signals, where each of the N number of encoders includes:

a reference current source circuit configured to generate a current having a level of I and a current having a level of 2I; and a voltage-to-current converter circuit configured to output a current having a level of 0 indicating a space state according to the request signal inputted from the data transmitter. output the current having the level of I when the data signal is 0 in such a state that the request signal inputted from the data transmitter is in an activated state, and output the current having the level of 2I when the data signal is 1; and N number of decoders configured to recover the current-level signals inputted from the encoders into voltage-level signals, where each of the decoders includes:

a threshold current source circuit configured to generate a first threshold current and a second threshold current;

an input current mirror circuit configured to differentiate the first threshold current and the second threshold current in response to a level of the input current inputted from the encoder; and a current-to-voltage converter circuit configured to detect the differentiated threshold current, recover a voltage input value due to the differentiated current, and extract a data signal and a request signal from the recovered voltage-level signal; and wherein the current-to-voltage converter circuit includes:

a second inverter configured to detect the differentiated threshold current, recover the voltage input value due to the differential current, and invert the recovered voltage-level signal to output the request signal; and a third inverter configured to detect the differentiated threshold current, recover the voltage input value due to the differential current, and invert the recovered voltage-level signal to output the data signal.

* * * * *